(12) United States Patent
Kokkelink et al.

(10) Patent No.: US 6,339,661 B1
(45) Date of Patent: Jan. 15, 2002

(54) POLARIZATION MAINTAINING FIBER OPTIC CIRCULATORS

(75) Inventors: Jan W. Kokkelink, Blairstown; Talal K. Findakly, Hackettstown, both of NJ (US)

(73) Assignee: Micro-Optics, Inc., Hackettstown, NJ (US)

( * ) Notice: Subject to any disclaimer, the term of this patent is extended or adjusted under 35 U.S.C. 154(b) by 0 days.

(21) Appl. No.: 09/693,422

(22) Filed: Oct. 20, 2000

Related U.S. Application Data

(60) Provisional application No. 60/160,514, filed on Oct. 20, 1999.

(51) Int. Cl.[7] .................................................. G02B 6/00
(52) U.S. Cl. ....................................................... 385/11
(58) Field of Search ...................... 385/11–13; 359/281, 359/282, 495, 496, 497; 372/703

(56) References Cited

U.S. PATENT DOCUMENTS

| 6,226,115 B1 | * | 5/2001 | Shirasaki et al. | .............. 385/11 |
| 6,236,506 B1 | * | 5/2001 | Cao | ........................... 359/484 |
| 6,278,547 B1 | * | 8/2001 | Betin | ......................... 359/484 |

* cited by examiner

*Primary Examiner*—Akm E. Ullah

(57) ABSTRACT

Polarization maintaining optical circulators for fiber optic applications. A first embodiment uses birefringent wedges and Faraday rotators in an inline configuration. The second embodiment utilizes a polarizing beam splitting cube and Faraday rotators which results in a design with the fibers being at either 90° or 180° with respect to each other, all in the same plane. A third embodiment makes use of a polarizing beam splitter cube and Faraday rotators with a reflector on one or both of the sides of the beam splitting cube which provides an device.

19 Claims, 7 Drawing Sheets

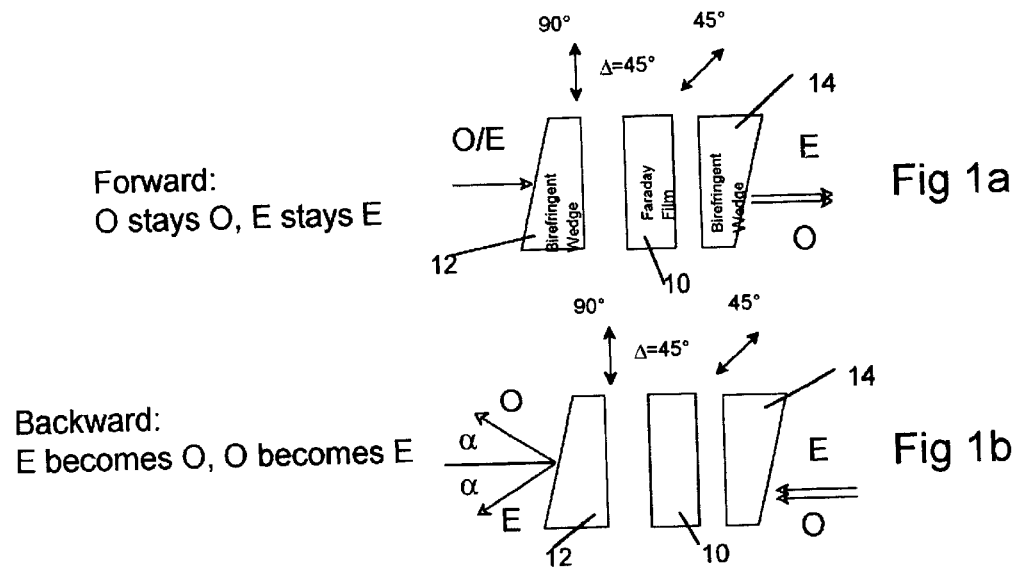
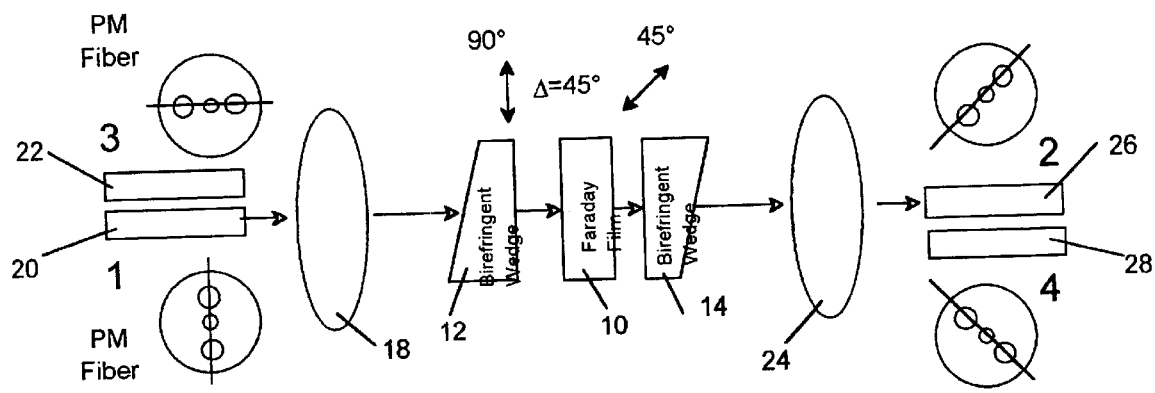
Fig. 2a

Port 1 to 2

Port 2 to 3

Port 3 to 4

US 6,339,661 B1

POLARIZATION MAINTAINING FIBER OPTIC CIRCULATORS

CROSS REFERENCE TO RELATED APPLICATIONS

This application claims the benefit of the filing date of U.S. provisional patent application Serial No. 60/160,514 filed Oct. 20, 1999.

BACKGROUND AND SUMMARY OF THE INVENTION

The present invention is directed to optical components for use in fiber optic networks and particularly to devices known as optical circulators and more particularly to polarization maintaining fiber optic circulators.

By directing signal flow in the proper direction, optical circulators can reduce system cost and complexity in optical equipment used in fiber optic networks. In complex optical networks, passive optical components are essential elements for sorting and delivering signals to their proper destination. To accomplish this control, the optical-signal flow through the sequential ports of a circulator is guided in a fashion comparable to that of vehicles entering and leaving a traffic circle. A circulator transmits an incoming signal entering Port 1 to Port 2 while transmitting another incoming signal from Port 2 to Port 3, and another from Port 3 to Port 4 etc. The number of ports can be increased arbitrarily, and it is possible to have fully circulating devices (also called an closed loop circulator), in which light entering the last port exits the first port, and quasi-circulating devices (also called an open loop circulator), wherein the light from the last port does not return to the first port, this quasi-circulator is the most common type. The performance advantages of optical circulators make them indispensable for routing bidirectional optical traffic. Firstly, optical circulators are low-loss devices, unlike splitters that incrementally add 3-dB losses for each device used. Secondly, optical circulators have high adjacent port isolation and eliminate the need for external isolators.

As fiber optic communication systems increase in complexity and functionality, the demand for increased capacity and efficient (low loss) signal routing management increases. For example, in duplex (bidirectional) transmission, the conventional use of fused fiber 3 dB couplers costs the system more than 6 dB in loss. The use of optical circulators in such cases saves about 5 dB's due to the ability of circulators to route the signal in its entirety in the desired direction. Optical circulators are also important and enabling components in ADD/DROP applications. Optical circulators are forecast to play a significant role in duplex transmission, optical time domain reflectometry (OTDR) measurement systems, wavelength division/multiplexing (WDM) transmission systems and Erbium (Er) doped fiber amplifiers (EDFA).

The present invention provides polarization maintaining circulators of a number of embodiments. The first embodiment uses birefringent wedges and Faraday rotators and is an inline design, meaning the fibers are all inline with each other. This design is described in a 3 port version, however it can be extended to 4 or more ports. Inline designs are generally more compact, less complex and reduce alignment problems as compared to non-inline designs. The second embodiment makes use of a polarizing beam splitting cube and Faraday rotators which results in a design with the fibers being at either 90° or 180° with respect to each other, all in the same plane. This second embodiment is limited to a maximum of 4 ports but has the advantage of being a closed design, meaning that light launched from a port will eventually return to that port, for example light launched form port 1 will follow the following sequence: $1_s \rightarrow 2_s \rightarrow 3_{ss} \rightarrow 4_s \rightarrow 1_s$, for the fast axis the sequence is slightly different: $1_f \rightarrow 4_f \rightarrow 3_f \rightarrow 2_f \rightarrow 1_f$. Note that the axes of polarization maintaining optical fibers are referred to as "slow" (or major) and "fast" (which relates to the relative propagation velocities).

A third embodiment makes use of beam splitter cubes and Faraday rotators, like the second. However the difference is now that instead of having 3 or 4 separate fibers, two fibers are combined into one holder, making this an inline device. This is accomplished by placing a reflector on one or both of the sides of the polarizing beam splitting cube (depending on a 3 or 4 port design). The four port design of this embodiment is of the closed variety, meaning that light launched into the slow axis of port 1 will follow the following route: $1_s \rightarrow 2_s \rightarrow 3_s \rightarrow 4_s \rightarrow 1_s$, light launched into the fast axis of port 1 will follow: $1_f \rightarrow 4_f \rightarrow 3_f \rightarrow 2_f \rightarrow 1_f$, which is similar to that of the previous design.

BRIEF DESCRIPTION OF THE DRAWINGS

For a better understanding of the invention, reference is made to the following drawings which are to be taken in conjunction with the detailed description to follow in which:

FIGS. 1a and 1b illustrates the operation of a birefringent wedges and Faraday rotator unit which forms the optical isolating component of the present invention;

FIGS. 2a, 2b and 2c illustrates the components of a polarization maintaining optical circulator of a first embodiment of the present invention using birefringent wedges;

DESCRIPTION OF THE PREFERRED EMBODIMENTS

Figure 2B:
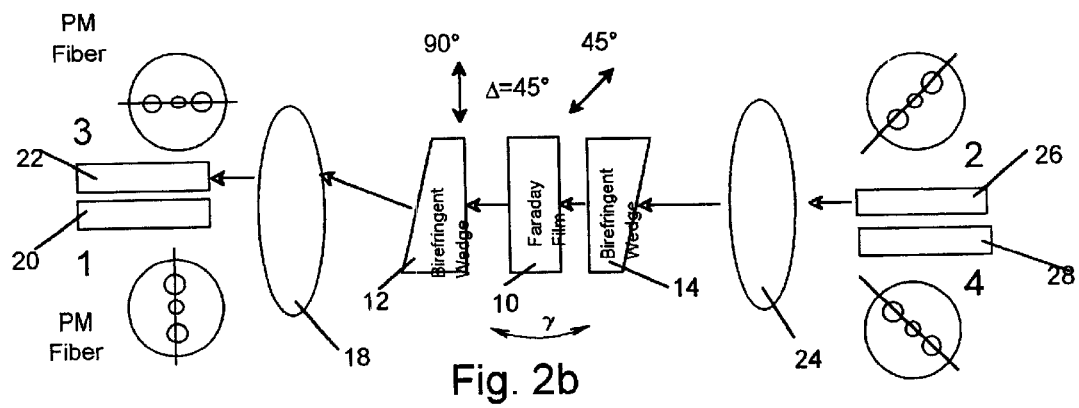

Polarization Maintaining Optical Circulator Using Birefringent Wedges

The principle of operation of the birefringent wedge based circulator is shown in FIG. 1a and 1b, a nonreciprocal 45° Faraday rotating film 10 is placed in between two birefringent wedges 12, 14 having their optical axis at 45° from each other and with the optical axes perpendicular to the direction of light propagation, and with the base of wedge 12 disposed downwardly and the base of wedge 14 disposed upwardly (i.e. one wedge is inverted with respect to the other). As illustrated by the double headed arrows the optical axis of birefringent wedge 12 is disposed at 90° degrees (i.e. lying in the plane of the paper) and that of birefringent wedge 14 is rotated 45° out of the plane of the paper.

In the forward (transmission) direction shown in FIG. 1a, birefringent wedge 12 splits the input light beam into two orthogonal states of polarization, extraordinary "E" and ordinary "O" beams. Faraday rotating film 10 rotates both "E" and "O" beams by 45°. Because the optic axis of birefringent wedge 14 is at 45° from the wedge 12, the "E" and "O" polarizations travel through birefringent wedge 14 as "E" and "O" (i.e. they maintain their respective input polarization state with respect to wedge 14) and therefore exit wedge 14 in a direction parallel to each other.

In the backward or reverse direction as shown in FIG. 1b, birefringent wedge 14 splits the beam in two orthogonal ("E" and "O") polarizations. After passing through Faraday rotating film 10 (which rotates both polarizations by 45° in the same direction—Note: viewed along the direction of the light beam the rotation caused by Faraday rotating film 10 is clockwise going forward and counterclockwise going in reverse) the "E" beam becomes "O" and the "O" beam becomes "E", with respect to the considered wedges, as they travel through wedge 12 since its optic axis is at 45° from the wedge 14. Because of this, the two beams exit birefringent wedge 12 not in parallel with each other but separated from each other (and from the input beam) by an angle a and so will not couple back into the input fiber. Suitable birefringent materials for wedges 14, 16 include, but are not limited to, lithium niobate ($LiNbO_3$), rutile ($TiO_2$), and yttrium vanadate ($YVO_4$).

Figure 2C:
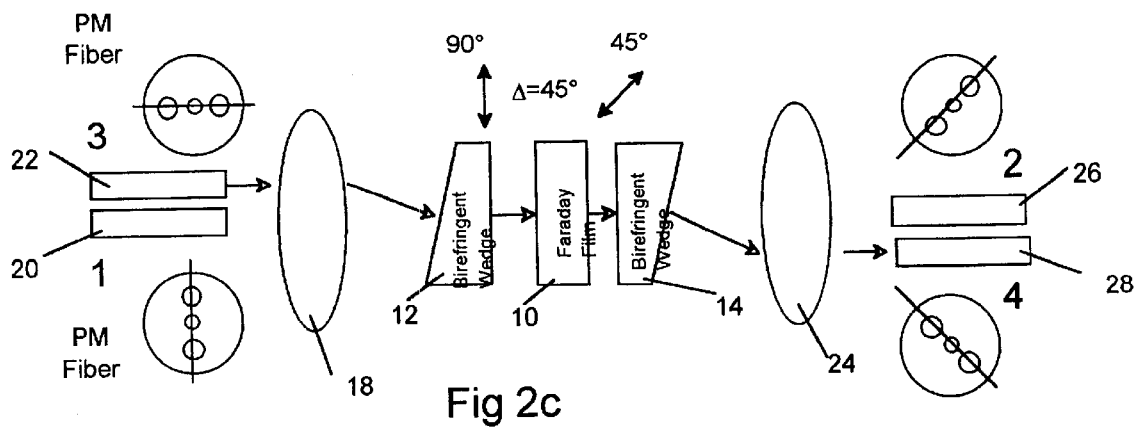

The first embodiment of an inline polarization maintaining (PM) circulator based on birefringent wedges 12, 14 and Faraday rotator 10 of FIG. 1 is illustrated in FIGS. 2a to 2c. A collimating lens 18 is used at the input end to couple light from and into two adjacent polarization maintaining fibers 20, 22 representing ports 1 and 3 respectively. An output collimating lens 24 couples light into two adjacent polarization maintaining fibers 26, 28 representing ports 2 and 4 respectively. As shown by the alignment diagrams disposed adjacent to the fibers the slow axis (or major axis) of input polarization maintaining fiber 20 is aligned parallel to the optic axis of birefringent wedge 12. The slow axis of output polarization maintaining fiber 26 (port 2) is oriented perpendicular the optic axis of the second birefringent wedge 14. Fiber 22 of Port 3 has its slow axis perpendicular to the optic axis of birefringent wedge 12 and fiber 28 of Port 4 has its slow axis perpendicular to the optic axis of birefringent wedge 14. Light is transmitted from port 1 to port 2 (but not into port 3), from port 2 into port 3 (but not into port 1) and from port 3 into port 4 (but not into port 2). The actual direction of orientation of the optical axes of birefringent wedges 14, 16 is not critical as long as the optical axes of the two wedges are at 45° from each other, perpendicular to the light propagation direction and aligned with their respective input and output fibers. Collimating lenses 16, 20 may be of the usual types used in fiber optic systems such as graded index (GRIN) lenses.

By placing input lens 18 at one focal length from the fiber pair 20, 22 of ports 1 and 3, light from port 1 will be collimated into the device. FIG. 2a shows the path from port 1 to port 2 which path is the same as that shown in FIG. 1a. If an "E" beam is coming from port 1, it will be collimated into the device and enter the first birefringent wedge 12. In this direction the polarization states, with respect to the birefringent wedges, are preserved and therefore no angular deviation of the beam will take place, resulting in the beam staying parallel to the beam launched from port 1. This light will now be focused into fiber 26 at port 2. FIG. 2b shows the path from port 1 to port 2 which path is the same as the reverse path shown in FIG. 1b. Light entering the birefringent wedge set from fiber 26 of port 2 ("E" with respect to wedge 14), will be deviated at angle α, with respect to the beam launched from port 1, upon leaving wedge 14, due to the fact that in this propagation direction the polarization states, with respect to the wedges are not preserved (it is now "O" with respect to wedge 12). This light will now be focused into fiber 22 of port 3. FIG. 2c shows the path from port 3 to port 4, in this path light from fiber 22 will be collimated by lens 18 and enter wedge 12 at an angle, in this path the light will exit wedge 14 at an angle, but still parallel to the beam launched from port 3, so as to intercept fiber 28 of port 4 but not fiber 26 of port 2.

Excessive insertion loss can be the result of tolerances in the components, such as wedge angle, lens focal lengths, and fiber separation (distance between the fiber cores on the 2 fiber side of the device). These tolerances can be compensated for by tilting (tipping) the wedges in the plane defined by the in angle separated "O" and "E" beams (see angle γ in FIG. 2b). This tilting will have the result of changing the angle between the "O" and "E" beams and therefore compensating for the above-mentioned tolerances. Another way of compensating for these tolerances is by using compound lenses, in which the focal length can be varied. This will also have the desired compensating effect.

The circulators described herein have used polarization maintaining input and output fibers with their optic axes aligned with the optic axes of their respective birefringent wedges. This OA alignment assures maximum performance of the circulators by eliminating power coupling from one polarization state to the other and therefor power coupling between the fiber ports. However the use of a single mode fibers, in certain applications, may provide adequate performance.

The above described circulators provides a substantially symmetrical beam splitting, however, it is to be understood that other birefringent wedge configurations providing non-symmetrical beam splitting can also be used in this invention. It is also to be noted that optical circulators using birefringent wedges with their optic axes disposed at other than 45° to each other can be designed with the use of a waveplate as an additional component.

Figure 3A:
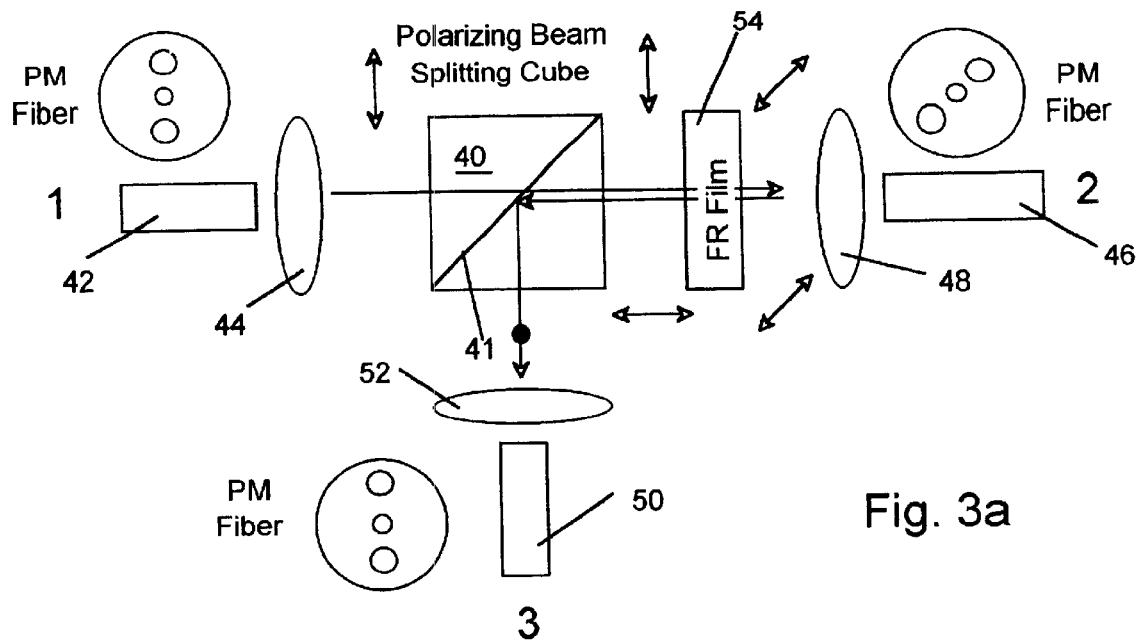
FIGS. 3a through 3c show a second embodiment of a polarization maintaining circulator based on a polarizing beam splitting cube and one or more 45° non-reciprocal Faraday polarization rotating films.
Figure 3B:
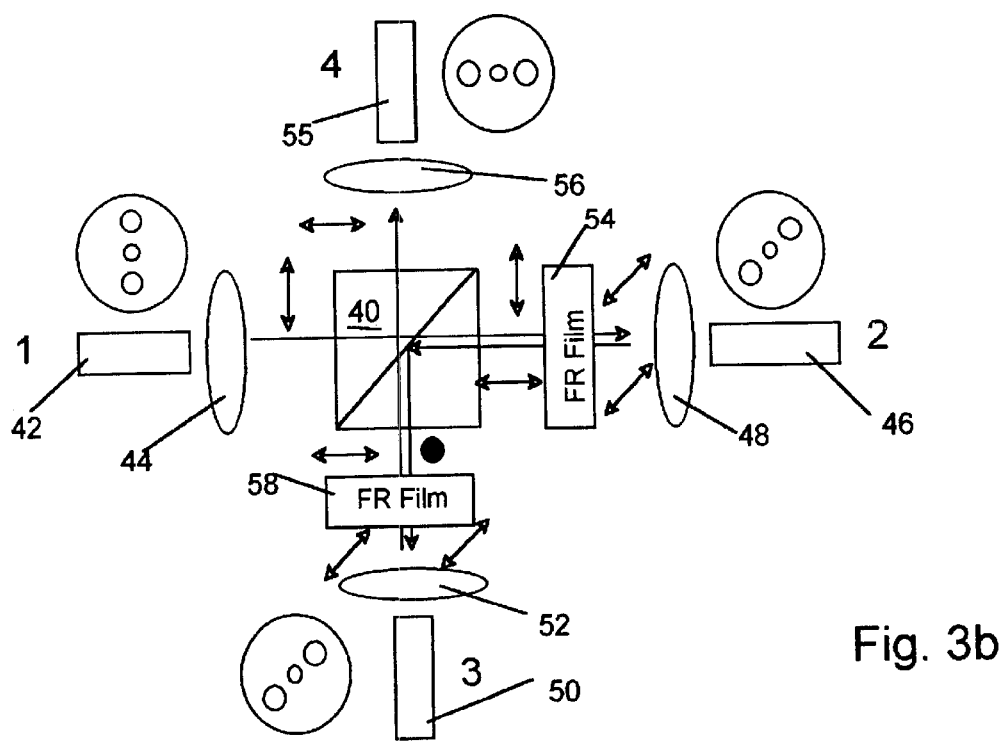
Figure 3C:
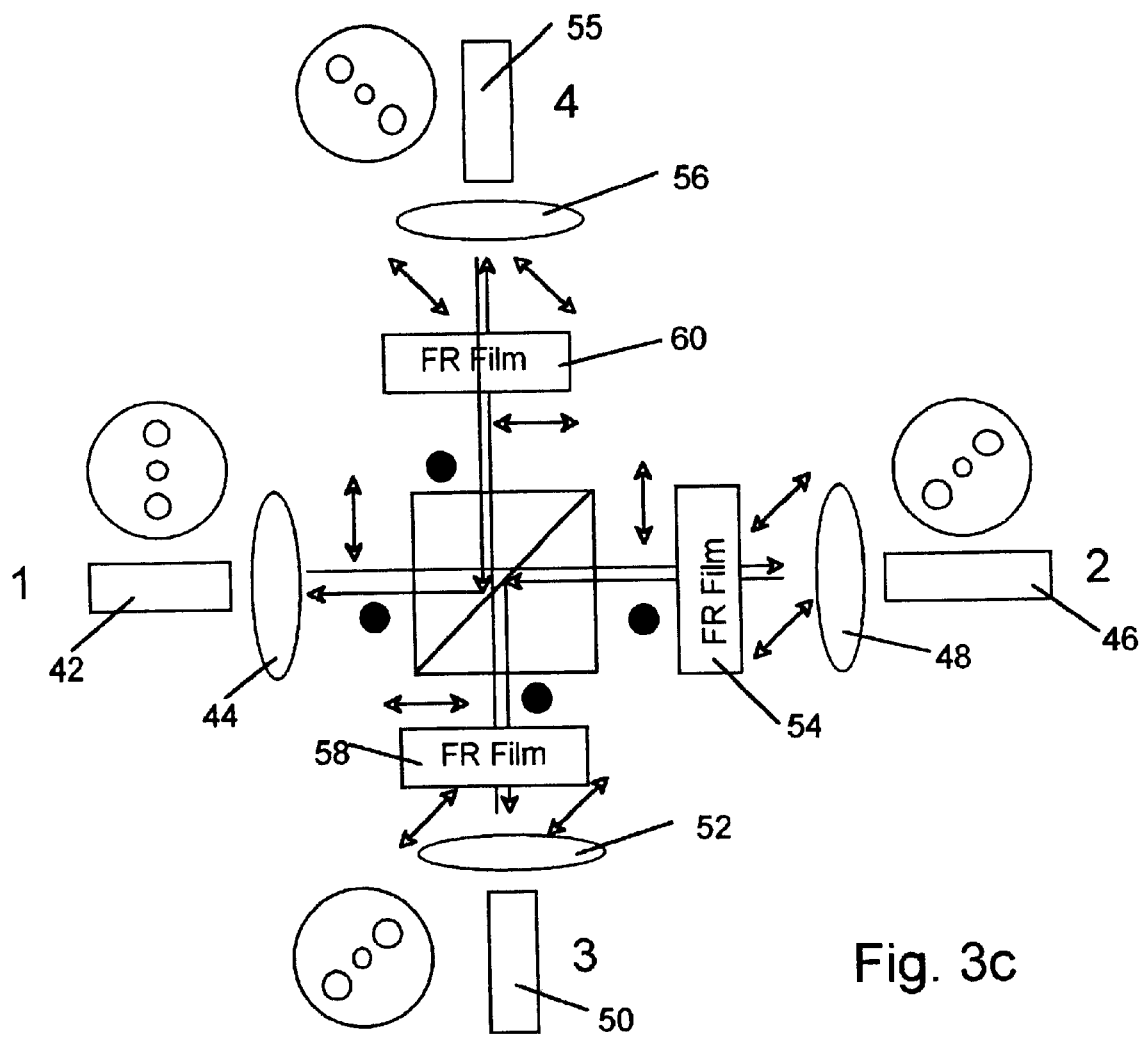

Polarization Maintaining Optical Circulator Using Polarizing Beam Splitting Cubes FIGS. 3a through 3c show a polarization maintaining circulator based on a polarizing beam splitting cube and one or more 45° non-reciprocal Faraday rotating films (referred to as FR films), the number of FR films is determined by the number of fiber ports and type of circulator (open or closed).depending on the number of ports desired. For a three port circulator, one Faraday rotator film is used. For a four port circulator, two Faraday rotator films are used. For a closed loop four port circulator, three Faraday rotator films are used. In all cases, at each port a polarization maintaining fiber and a lens are used for collimating the optical beam into the beam splitting cube and coupling into the respective output ports. For ease of assembly, the optical path lengths (OPL) between lenses is set at twice the focal length (f) of these lenses, so the OPL from 1 to 2 is 2f, from 2 to 3 is also 2f etc.

A three port circulator is illustrated in FIG. 3a and includes a polarizing beam splitting cube 40 (or a polarizing beam splitting film mounted diagonally) and three ports. Port one includes an input polarization maintaining fiber 42 and a collimating lens 44, port two includes a polarization maintaining fiber 46 and collimating lens 48, and port three includes a polarization maintaining fiber 50 and a collimating lens 52. A Faraday rotator film 54 is placed in the optical path leading to port 2 after polarizing beam splitting cube 40. As shown by the alignment diagrams disposed adjacent to the fibers, fiber 46 of port 2 is aligned with its slow axis at 45° from input fiber 42, and fiber 50 of port 3 is aligned with its slow axis at 45° from the polarization maintaining fiber of port 2.

The principle of operation of the three port polarization maintaining circulator of FIG. 3a is as follows: P (light launched along the slow or major axis of the PM fiber 42) polarized light from fiber 42 of port 1 passes through polarizing beam splitting cube (PBSC) 40, is rotated 45° by Faraday rotator film 54, and is focused by lens 48 on fiber 46 of port 2 (which has its slow axis parallel to the polarization of incoming beam which is at 45° from the input). This completes the port 1 to port 2 path. A beam from fiber 46 of port 2 goes through Faraday rotator film 54 thus entering polarizing beam splitting cube 40 as S polarized and is reflected at the polarizing beam splitting cube's 40 diagonal 41 towards port 3 where it is focused by lens 52 on to fiber 50 of port 3. No light from port 2 is transmitted to port 1. The slow axis of fiber 50 of port 3 is aligned parallel to the incoming S polarization. This completes the path of port 2 to 3. Light launched from fiber 50 of port 3 will either couple back into fiber 46 of port 2 or be lost, depending on the polarization state.

FIG. 3b illustrates this version of the proposed polarization maintaining circulator in an open loop four port configuration. In this drawing the same reference numbers as those of FIG. 3a are used to identify the same components, with the addition of a fourth port having a polarization maintaining fiber 55 and a collimating lens 56 a second Faraday rotator film 58 is placed in the optical path leading to port 3 after polarizing beam splitting cube 40. The principle of operation of this four port polarization maintaining circulator is as follows: P polarized light from port 1 passes through polarizing beam splitting cube 40, gets rotated by 45° by Faraday rotator film 54 and is focused on fiber 46 of port 2 (which has its slow axis parallel to the polarization of incoming beam which is at 45° from the input). This completes the port 1 to 2 path.

A beam from port 2 goes through Faraday rotator film 54 thus entering polarizing beam splitting cube 40 as S polarized and is reflected at diagonal 41 towards port 3 where it passes through second Faraday rotator film 58 thus rotating the polarization by an additional 45° and is focused by lens 52 on to fiber 50 of port 3. No light from port 2 is transmitted to port 1. The slow axis of fiber 50 of port 3 is aligned parallel to the incoming polarization which is at 45° (Note the different orientation of fiber 50 from FIGS. 3a to 3b). This completes the path of port 2 to 3. A beam from port 3 goes through Faraday rotator film 58 and is rotated by 45° thus making it a P polarized beam as it enters the polarizing beam splitting cube 40. The P polarized beam passes straight through polarizing beam splitting cube 40 towards port 4 where it is coupled into polarization maintaining fiber 55 of port 4 by lens 56. The slow axis of the polarization maintaining fiber 55 of port 4 is aligned parallel to the incoming P polarization. This completes the path of port 3 to 4.

A closed loop four port circulator is illustrated in FIG. 3c, which has the same components as that of FIG. 3b with the addition of a third Faraday rotator film 60 placed in the optical path leading to port 4 after polarizing bean splitting cube 40. The alignment of the fibers of this configuration is the same as that of FIG. 3b with the exception of fiber 55 of port 4 is aligned with its slow axis at 90° from fiber 50 of port 3 as a beam traveling from port 3 to port 4 will be rotated twice by 45° by Faraday rotators 58 and 60. If it is desired that the closed loop circulator maintain the polarization state when launching from port 4 to port 1 an additional Faraday rotator film would be placed at port 1 between lens 44 and polarizing beam splitting cube 40. This will result in fiber 42 axis being placed at 45° with respect to the open loop device.

In the closed loop circulator of FIG. 3c the port order will differ depending upon the polarization of the light input in port 1. When launching light from fiber 42 of port 1, with its polarization state parallel to the slow axis of the fiber, the port sequence is: $1_s \rightarrow 2_s \rightarrow 2_s \rightarrow 3_{ss} \rightarrow 1_s$. For light with its polarization state perpendicular to the slow axis (the fast axis) of port 1 the sequence will be: $1_f \rightarrow 4_f \rightarrow 3_f \rightarrow 2_f \rightarrow 1_f$.

In line Polarization Maintaining Optical Circulator Using Polarizing Beam Splitting Cubes FIGS. 4a–4e illustrate a four port polarization maintaining fiber optic closed loop circulator 70. This version of a polarization maintaining circulator is based on the use of a polarizing beam splitter cube 72 (PBSC) with reflective coatings 74, 76 on the surfaces that are perpendicular to the light paths. Circulator 70 includes polarization maintaining fibers 78, 80 forming ports 1 and 2, and polarization maintaining fibers 82, 84 forming ports 3 and 4 respectively. A collimating lens 86 and a 45° Faraday polarization rotator (FR) 88 is placed between ports 1 and 2 and polarizing beam splitter cube 72 and collimating lens 90 and a 45° Faraday rotator 92 is placed between ports 3 and 4 and polarizing beam splitter cube 72. The orientation of the polarization maintaining fibers 78, 80, 82 and 84 is shown in the drawings and is such that the polarization alignment from one fiber to the other is maintained, if desired other orientations of the fibers can be used.

Figure 4A:
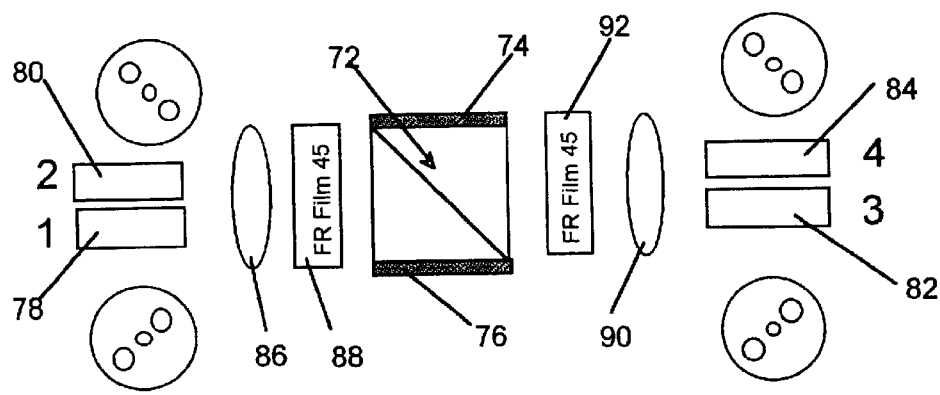
FIGS. 4a through 4e show a third embodiment of an inline polarization maintaining circulator based on a polarizing beam splitting cube and one or more 45° non-reciprocal Faraday polarization rotating films with reflecting surfaces disposed on one or more surfaces of the polarizing beam splitting cube.
Figure 4B:
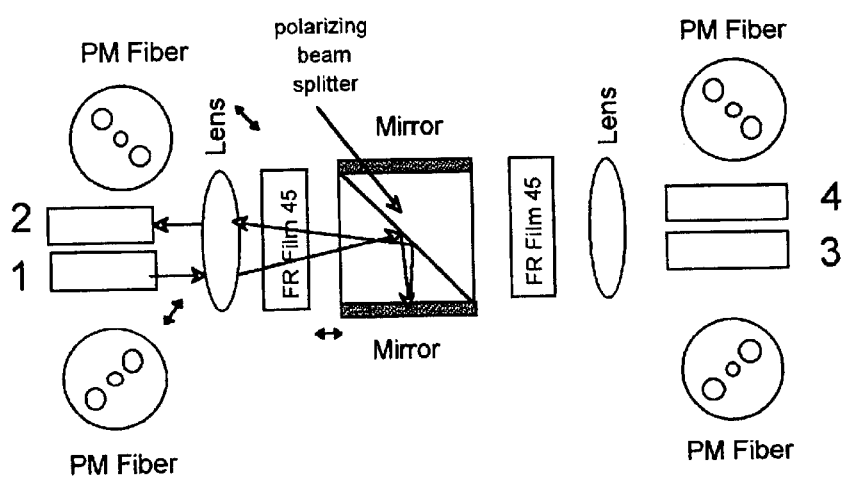

FIG. 4b illustrates the light path from port 1 to port 2, light launched from fiber 78 of port 1 (slow axis) is collimated and passes through lens 86 and Faraday rotator 88, for this polarization state (S state with respect to polarizing beam splitter cube 72) polarizing beam splitter cube 72 will reflect the light at the 45° beam splitting surface to the surface of mirror 76, and again at the beam splitting surface. If the condition of the optical path length from the lens to the mirror is one focal length of the lens used and fibers 1 and 2 are positioned correctly with respect to the lens, the light will reflect back into fiber 2 (and the polarization state will be aligned with the slow axis of fiber 2).

Figure 4C:
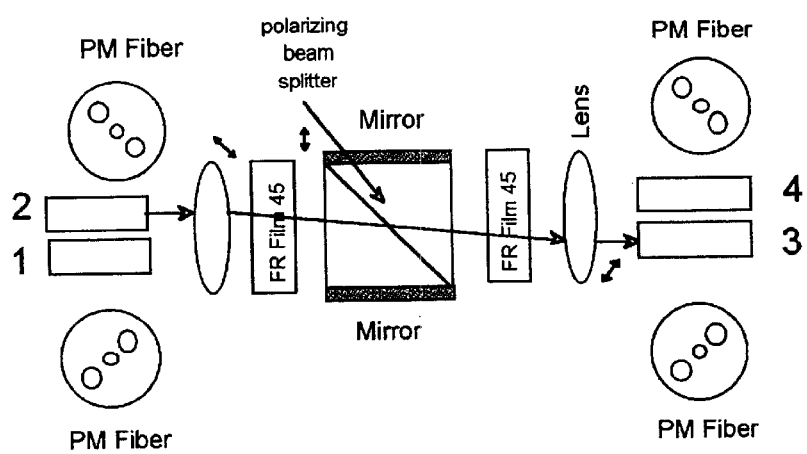
Figure 4D:
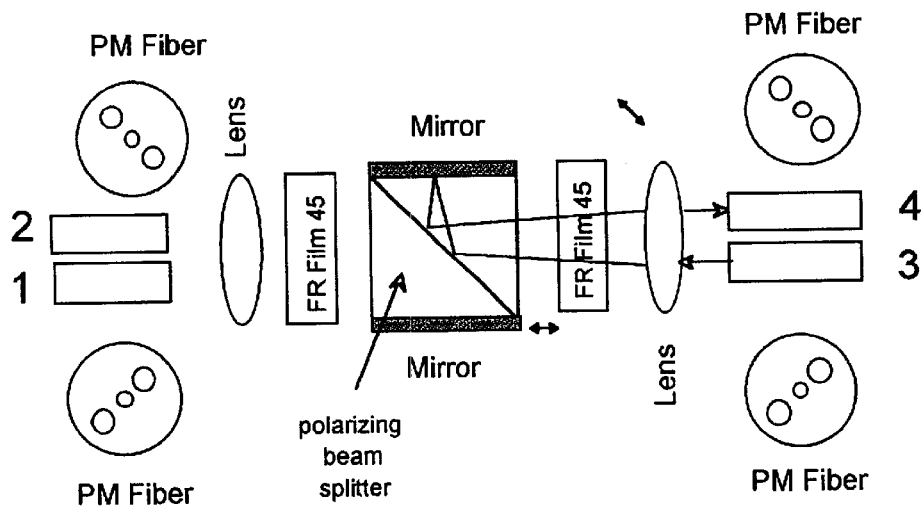
Figure 4E:
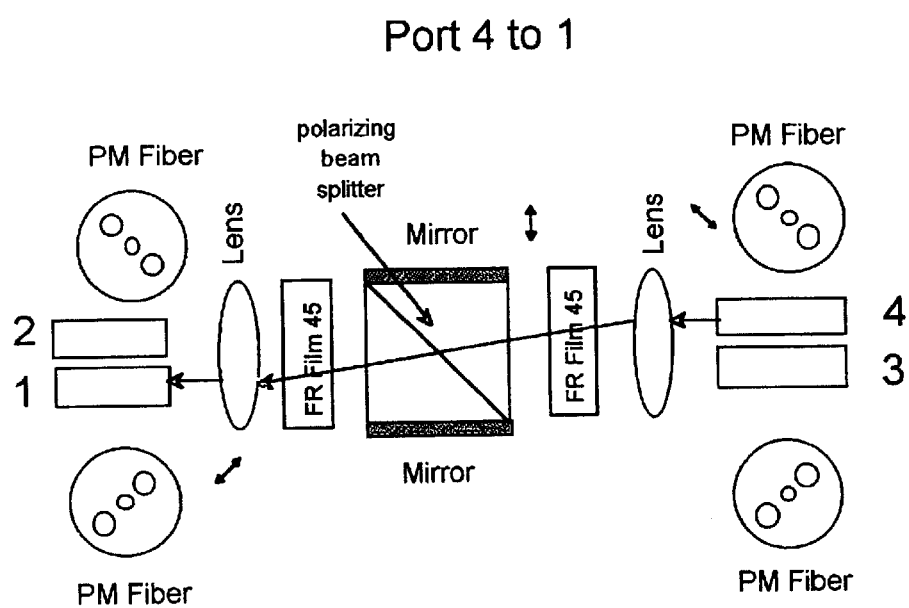

FIG. 4c illustrates the light path from port 2 to port 3, light launched from fiber 80 of port 2 (still in the slow axis) will enter the polarizing beam splitter cube 72 in the P state, due to Faraday rotator 88 and thus be transmitted instead of reflected and so couple into fiber 82 of port 3. FIG. 4d illustrates the light path from port 3 to port 4, light launched from fiber 82 of port 3 (slow axis) will enter the polarizing beam splitter cube 72 in the S state and reflect from the beam splitting surface, mirror 74 and the beam spitting surface again into fiber 84 of port 4. FIG. 4e illustrates the light path from port 4 to port 1 to complete the closed loop, light launched from fiber 84 of port 4 (slow axis) will enter the polarizing beam splitter cube 72 which will transmit again and couple into fiber 80 of port 1. Thus light launched into the slow axis of port 1 will follow the following route: $1_s \rightarrow 2_s \rightarrow 3_s \rightarrow 4_s \rightarrow 1_s$, However, light launched into the fast axis of fiber 1 will follow: $1_f \rightarrow 4_f \rightarrow 3_f \rightarrow 2_f \rightarrow 1_f$.

The four port closed loop design described above can readily be converted into a three port open loop configuration by omitting the fourth port and mirror 74. FR film 92 can also be omitted for the 3 port design, however light launched from port 3 will then couple back into port 2. The most efficient design places the reflecting surfaces on the faces of the polarizing beam splitter cube. However, the reflecting surfaces can also be in the form of separate mirrors.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. An inline polarization maintaining optical circulator for at least three optical fibers comprising:
   a birefringent wedge set having first and second birefringent wedges, wherein said first birefringent wedge has an optical axis disposed at 45° to the optical axis of the second birefringent wedge and perpendicular to the light propagation direction, with the bases of the birefringent wedges being oppositely disposed;
   a nonreciprocal 45° polarization rotating film disposed between said first and second birefringent wedges;
   a first polarization maintaining optical fiber forming a first port, said fiber being disposed on a first side of said birefringent wedge set, and having its slow axis aligned with the optical axis of the first birefringent wedge;
   a second polarization maintaining optical fiber forming a second port, said fiber being disposed on a second side of said birefringent wedge set, having its slow axis aligned with the optical axis of the second birefringent wedge;
   a third polarization maintaining optical fiber forming a third port, said fiber being disposed on the first side of said birefringent wedge set, said having its slow axis aligned perpendicular to the optical axis of the first polarization maintaining optical fiber; and
   said birefringent wedge set and said nonreciprocal 45° polarization rotating film splitting a light beam originating from said first optical fiber into first and second beams, and thereafter recombining said first and second beams such that they are parallel and collinear with each other and directing said recombined beam into the second optical fiber; said birefringent wedge set and said nonreciprocal 45° polarization rotating film splitting a light beam originating from said second output fiber into first and second beams, and thereafter directing said split beams at an angle such that one of said beams will impinge upon the third optical fiber.

2. The optical circulator as claimed in claim 1 further including a fourth polarization maintaining optical fiber forming a fourth port, said fiber being disposed on the second side of said birefringent wedge set, said having its slow axis aligned perpendicular to the optical axis of the second polarization maintaining optical fiber.

3. The optical circulator as claimed in claim 1 further including a collimating lens disposed on the first side of the birefringent wedge set between the first and third optical fibers and the birefringent wedge set.

4. The optical circulator as claimed in claim 3 wherein the collimating lens disposed on the first side of the birefringent wedge set comprises a graded index lens.

5. The optical circulator as claimed in claim 1 further including a collimating lens disposed on the second side of the birefringent wedge set between the second optical fiber and the birefringent wedge set.

6. The optical circulator as claimed in claim 5 wherein the collimating lens disposed on the second side of the birefringent wedge set comprises a graded index lens.

7. The optical circulator as claimed in claim 1 wherein the first, second and third fibers are parallel to each other.

8. The optical circulator as claimed in claim 1 wherein the birefringent wedges are selected from the group consisting of lithium niobate (LiNbO3), rutile (TiO2), and yttrium vanadate (YVO4).

9. A polarization maintaining optical circulator for at least three optical fibers comprising:
   a polarizing beam splitter for splitting light into two orthogonal linear polarizations with one polarization being transmitted and the other being reflected;
   a first polarization maintaining optical fiber forming a first port and disposed on a first side of said polarizing beam splitter, said fiber directing a light beam into the polarizing beam splitter;
   a second polarization maintaining optical fiber forming a second port and disposed on a second side of said polarizing beam splitter for receiving the polarized light transmitted through the polarizing beam splitter and for directing light from the second port into the polarizing beam splitter;
   a nonreciprocal 45° polarization rotating film disposed between the polarizing beam splitter and the second optical fiber;
   a third polarization maintaining optical fiber forming a third port, said fiber being disposed so as to receive the light reflected by the polarizing beam splitter from the second port;
   said first optical fiber having its slow axis oriented in a predetermined direction, said second optical fiber having its slow axis oriented at 45° to the first optical fiber, said third optical fiber having its slow axis oriented at 45° to the second optical fiber, wherein light entering the first port will be transmitted through the polarizing beam splitter to the second port and light entering the second port will be reflected from the polarizing beam splitter and directed to the third port.

10. The optical circulator as claimed in claim 9 further including a fourth polarization maintaining optical fiber forming a fourth port, said fiber being disposed opposite to the third port and a second nonreciprocal 45° polarization rotating film disposed between the polarizing beam splitter and the third optical fiber wherein light entering the third port will be transmitted through the polarizing beam splitter to the fourth port.

11. The optical circulator as claimed in claim 10 further including a third nonreciprocal 45° polarization rotating film disposed between the polarizing beam splitter and the fourth optical fiber wherein light entering the fourth port will be reflected through the polarizing beam splitter to the first port.

12. The optical circulator as claimed in claim 9 further including a collimating lens disposed between at least one of the first, second and third optical fibers and the polarizing beam splitter.

13. The optical circulator as claimed in claim 12 wherein the collimating lens disposed on the first side of the birefringent wedge set comprises a graded index lens.

14. The optical circulator as claimed in claim 9 wherein the polarizing beam splitter comprises a polarizing beam splitting cube.

15. An inline polarization maintaining optical circulator for at least three optical fibers comprising:
   a polarizing beam splitter for splitting light into two orthogonal linear polarizations with one polarization being transmitted and the other being reflected;
   a first polarization maintaining optical fiber forming a first port and disposed on a first side of said polarizing beam splitter, said fiber directing a light beam into the polarizing beam splitter;
   a second polarization maintaining optical fiber forming a second port and disposed on the first side of said polarizing beam splitter and parallel to the first fiber, said second fiber directing a light beam into the polarizing beam splitter;
   a first nonreciprocal 45° polarization rotating film disposed between the polarizing beam splitter and the first and second optical fibers;

a third polarization maintaining optical fiber forming a third port and disposed on a second side of said polarizing beam splitter opposite to said first optical fiber and parallel to the first and second optical fibers, said third optical fiber directing a light beam into the polarizing beam splitter;

a second nonreciprocal 45° polarization rotating film disposed between the polarizing beam splitter and the third optical fiber;

a first reflector disposed proximate to the polarizing beam splitter parallel to the optical fibers;

a second reflector disposed proximate to the polarizing beam splitter on the opposite side from the first reflector and parallel to the optical fibers; and wherein light entering the first port will be reflected from the polarizing beam splitter and the second reflector to the second port, and light entering the second port will be transmitted through the polarizing beam splitter and directed to the third port.

16. The inline optical circulator as claimed in claim 15 further including a fourth polarization maintaining optical fiber forming a fourth port, said fiber being disposed on the second side of the polarizing beam splitter and parallel to the third optical fiber wherein light entering the third port will be reflected from the polarizing beam splitter and the first reflector to the fourth port.

17. The inline optical circulator as claimed in claim 15 further including a first collimating lens disposed between the first and second optical fibers and the polarizing beam splitter and a second collimating lens disposed between the third optical fiber and the polarizing beam splitter.

18. The inline optical circulator as claimed in claim 17 wherein the collimating lenses comprise graded index lenses.

19. The inline optical circulator as claimed in claim 15 wherein the polarizing beam splitter comprises a polarizing beam splitting cube and the first and second reflectors are disposed on opposed surfaces of the polarizing beam splitting cube.

* * * * *